United States Patent [19]

Ohara et al.

[11] Patent Number: 5,544,137
[45] Date of Patent: Aug. 6, 1996

[54] OPTICAL DISC RECORD/PLAYBACK APPARATUS

[75] Inventors: Shunji Ohara; Tamotsu Matsuo; Kenzou Ishibashi, all of Osaka, Japan

[73] Assignee: Matsushita Electric Industrial Co., Ltd., Osaka, Japan

[21] Appl. No.: 80,583

[22] Filed: Jun. 21, 1993

Related U.S. Application Data

[63] Continuation of Ser. No. 610,612, Nov. 8, 1990, abandoned.

[30] Foreign Application Priority Data

Jul. 30, 1990 [JP] Japan ................................ 2-202181

[51] Int. Cl.$^6$ ........................................ G11B 7/00
[52] U.S. Cl. ........................ 369/54; 369/275.1; 369/116
[58] Field of Search ........................... 369/44.26, 44.27, 369/44.29, 44.31, 47, 48, 54, 58, 116, 124, 275.1, 53, 57; 360/133

[56] References Cited

U.S. PATENT DOCUMENTS

| | | | |
|---|---|---|---|
| 4,426,693 | 1/1984 | Satoh et al. | |
| 4,624,914 | 11/1986 | Kimura et al. | |
| 4,796,250 | 1/1989 | Kobayashi et al. | 369/54 |
| 4,890,273 | 12/1989 | Takeuchi et al. | 369/58 |
| 4,944,037 | 7/1990 | Ando | 369/116 |
| 4,972,399 | 11/1990 | Miyasaka | |
| 5,003,521 | 3/1991 | Yoshida et al. | 369/54 |
| 5,014,253 | 5/1991 | Morimoto et al. | 369/116 |
| 5,070,495 | 12/1991 | Bletsher, Jr. et al. | 369/116 |
| 5,072,435 | 12/1991 | Bakx | 369/116 |
| 5,226,027 | 7/1993 | Bakx | 369/54 X |

FOREIGN PATENT DOCUMENTS

| | | |
|---|---|---|
| 0288114 | 4/1988 | European Pat. Off. |
| 12488028 | 7/1981 | France |
| 3830745A1 | 3/1989 | Germany |
| 13732874 | 4/1989 | Germany |

OTHER PUBLICATIONS

Technical Article "A Single Beam Overwrite Optical Disc Memory Using A Phase Change Memory" Reprinted from SPIE vol. 1248, reporting Proceedings Of A Conference held Feb. 13–15, 1990; by Ohara et al.

*Primary Examiner*—Georgia Y. Epps
*Assistant Examiner*—Muhammad N. Eden
*Attorney, Agent, or Firm*—Amster, Rothstein & Ebenstein

[57] ABSTRACT

An optical disc record and playback apparatus is provided in which it is possible to record and play back information on erasable discs, as well as write-once discs. When a disc is first inserted into the record and playback apparatus, data written on a control track of the disc is read to identify whether the disc is erasable or write-once. Optimum record and playback parameters are then set depending upon the type of disc. Another aspect of the invention relates to an optical disc in which data representative of the optical sensitivity of the disc is recorded thereon during manufacture. The data is read by the record and playback apparatus and used to adjust the optical recording power so as to compensate for differences in optical sensitivities of different discs.

23 Claims, 11 Drawing Sheets

OPTICAL DISC RECORD/PLAYBACK APPARATUS

This is a continuation of application Ser. No. 07/610,612 filed on Nov. 8, 1990, now abandoned.

The present invention relates to an optical disc record and playback apparatus in which laser light is focused on a small spot in order to record information on and thereafter reproduce or erase that information from an optical disc. The present invention is particularly directed to a record and playback apparatus in which it is possible to record, erase and play back information on erasable type discs and record and playback information on write-once type discs.

BACKGROUND OF THE INVENTION

In the prior art, it is known to record and playback signals representing high density information by focusing laser light to a small spot on the surface of an optical disc. As an example of an ordinary optical disc record and playback apparatus, reference is made to U.S. Pat. No. 4,426,693. A prior art optical disc is enclosed in U.S. Pat. No. 4,624,914. These prior art patents disclose write-once optical discs, and a record and playback apparatus for use with such write-once type optical discs. A write-once type disc, as the name implies, is a disc which allows information to be written only once on a track thereof, although the information may thereafter be repeatedly read.

In recent years, there have also been proposed erasable type optical discs which permit information to be repeatedly written and erased on the same tracks. References describing erasable discs include "Million Cycle Overwritable Phase Change Optical Disk Media", SPIE Optical Data Storage Technical Digest Series, Volume 1, p. 14 TU A4-1 (1989) and "In-Se Based Phase Change Reversible Optical Recording Film", SPIE Proc. 695, p. 105 (1986).

Since write-once discs and erasable discs record and reproduce signals on a thin film recording layer by use of focused laser light, their recording and playback principles are very similar. However, prior art record and playback systems designed for use with write-once discs cannot be used with erasable discs.

SUMMARY OF THE INVENTION

It is an object of the present invention to provide an optical disc record and playback apparatus which may be used with both write-once discs and erasable discs.

It is a further object of the present invention to provide an optical disc record and playback apparatus having a laser power control circuit in which the operating parameters for a laser utilized therein are automatically set for the particular disc type.

It is another object of the present invention to provide an optical disc record and playback apparatus which includes a playback signal processing circuit in which the playback parameters for the apparatus are automatically set in accordance with the disc type inserted therein.

It is still another object of the present invention to provide an optical disc record and playback apparatus which includes a servo circuit having operating parameters which are automatically set in accordance with the disc type inserted therein.

Still another object of the present invention is to provide an optical disc record and playback apparatus in which a data format is automatically set in accordance with the disc type inserted therein.

Yet another object of the present invention is to provide an optical disc in which data corresponding to the optical sensitivity of said disc is recorded thereon during manufacture.

Another object of the present invention is to provide an optical disc record and playback apparatus in which the data corresponding to the optical sensitivity of the disc which is prerecorded thereon during manufacture is used to adjust the optical power during recording of information on the disc.

In the optical disc record and playback apparatus constructed in accordance with the present invention, data written on a control track of the disc is first read. This data provides information as to whether the disc is an erasable type or a write-once type. Appropriate recording and playback conditions are then automatically set, in accordance with the disc type.

More specifically, in the optical disc record and playback apparatus of the present invention, a control track is read to determine the type of disc which has been inserted therein, and recording and playback conditions appropriate to either an erasable type disc or a write-once type disc are set for a laser power control circuit, a playback signal processing circuit, a servo circuit, a data format, and a drive controller. Recording and playback may therefore be accomplished in the same apparatus with optical discs of different types.

In accordance with the present invention, an apparatus which utilizes a laser for optically recording, erasing and playing back information encoded on a disc which is either an erasable type disc or a write-once type disc is provided in which the operating parameters of the apparatus are set in accordance with the particular disc type. The apparatus comprises means for identifying disc type inserted therein, means for changing the operating parameters of the laser in accordance with the identified disc type, means for setting the playback parameters of the apparatus in accordance with the disc type inserted therein, means for providing focusing and tracking control of the laser with respect with the disc, in which the control parameters are set in accordance with the identified disc type, means for setting the format of the information encoded on the disc in accordance with the identified disc type, and means for selecting and setting the operating modes of the apparatus.

BRIEF DESCRIPTION OF THE DRAWINGS

For a fuller understanding of the nature, features and advantages of the present invention, reference should be made to the following detailed description of the various preferred, but nonetheless illustrative embodiments of the invention as illustrated by and taken in conjunction with the accompanying drawings wherein:

FIG. 5 shows the recording conditions for an erasable type disc, wherein FIG. 5(a) shows an optically modulated laser power waveform, FIG. 5(b) shows a schematic drawing of a track prior to recording, FIG. 5(c) is a schematic drawing of the track after recording, and FIG. 5(d) is a playback signal waveform.

FIG. 6 shows recording conditions for a write-once type disc wherein FIG. 6(a) shows an optically modulated laser power waveform, FIG. 6(b) is a schematic drawing of a track prior to recording, FIG. 6(c) is a schematic drawing of the track after recording, and FIG. 6(d) is a playback signal waveform.

FIG. 10 illustrates the data format of a write-once type disc wherein

FIG. 11 illustrates the data format of an erasable type disc wherein

DETAILED DESCRIPTION OF THE PREFERRED EMBODIMENTS

Figure 1:
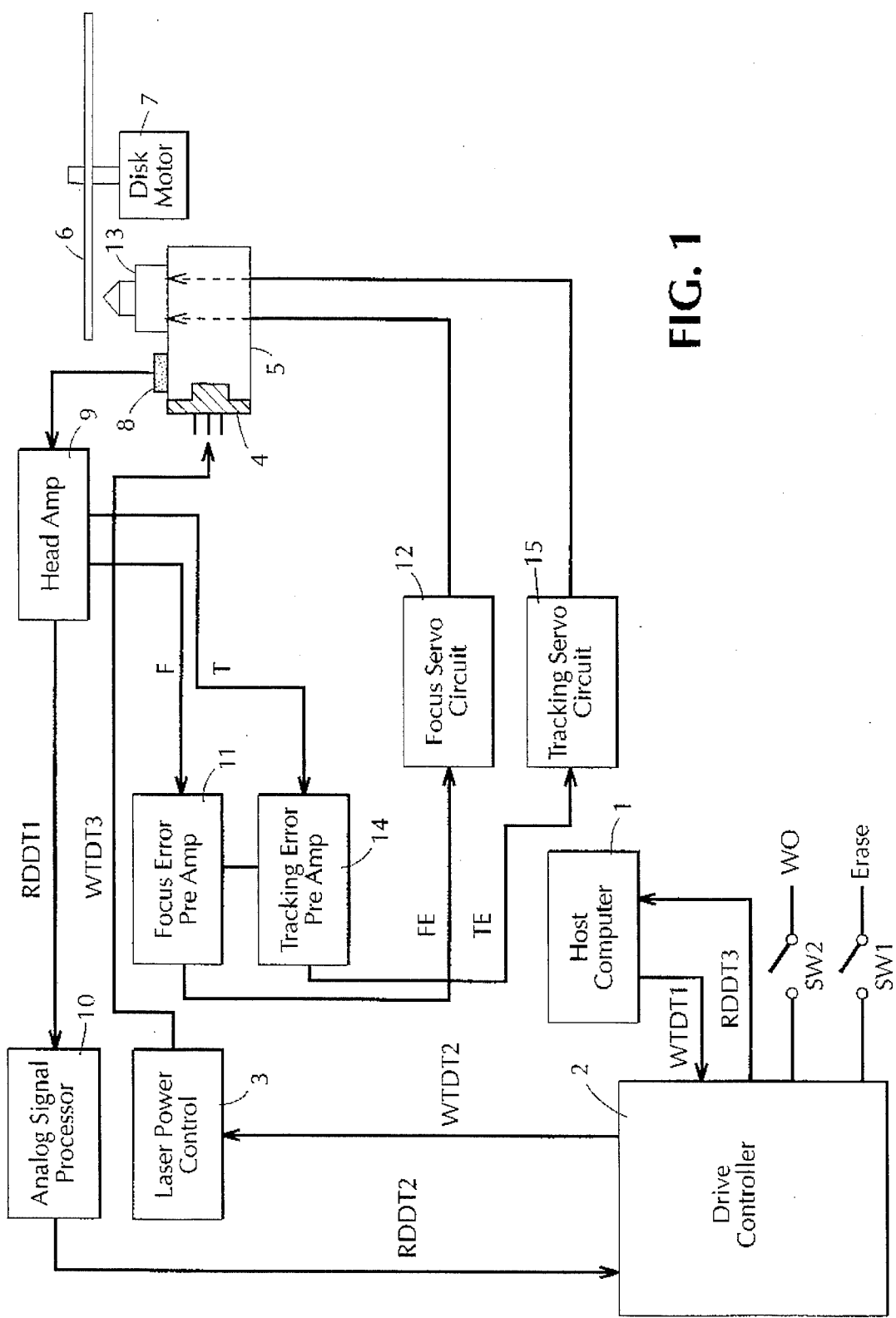
FIG. 1 is a block diagram of an optical disc record and playback apparatus in accordance with the present invention.

FIG. 1 shows a circuit block diagram of one embodiment of an optical disc record and playback apparatus in accordance with the present invention. With reference to FIG. 1, the procedure for recording data on a disc is first described. Data prepared by a host computer 1, represented as write data WTDT1, is sent to a drive controller 2. After the data is modulated and coded for error correction, it becomes data WTDT2 and is sent to a laser power control circuit 3, which converts the data WTDT2 into a signal WTDT3 for optical modulation of a laser diode 4. Signal WTDT3 is then recorded on an optical disc 6 through an optical head 5. The disc 6 may be an erasable type disc or a write-once type disc, and is rotated, for example, at 1800 rpm by means of a disc motor 7.

To read the data from the disc, the laser light output from laser diode 4 reflected from the disc 6 passes through the optical head 5 and is received by an optical detector 8. The output of the optical detector 8 passes through a head amplifier 9 and is divided into a playback signal RDDT1, a focus signal F for controlling a focus servo and a tracking signal T for controlling a tracking servo. The playback signal RDDT 1 is converted into binary values by an analog signal processor 10, thereby becoming read data RDDT 2, which is sent to the drive controller 2. In the drive controller 2, the read data RDDT2 is demodulated and error-corrected to become read data RDDT 3. This signal is then sent to the host computer 1, which reads the data.

The focus signal F is converted in focus error pre-amplifier 11 to a focus error signal FE which is applied to an actuator 13 through a focus servo circuit 12, for the purpose of maintaining proper focus of the laser light on the optical disc 6. Similarly, the tracking signal T is converted by tracking error pre-amplifier 14 to a tracking error signal TE which is applied to the actuator 13 in the optical head through a tracking servo circuit 15, for the purpose of maintaining proper tracking of the laser light with respect to the disc 6.

Switches SW 1 and SW 2 of FIG. 1 are disc selection switches. When only switch SW 1 is closed, an erasable mode is entered in which the record and playback apparatus is only permitted to write on an erasable type disc. In this mode, a write-once type disc can not be written on, but may only be played back. On the other hand, when only switch SW 2 is closed, a write-once mode is entered in which it is possible to only write on a write-once type disc. In the write-once mode, erasable type discs can not be written on, but may only be played back. If switches SW 1 and SW 2 are both closed, a multi-function mode is entered in which recording and playback are possible on both erasable type discs as well as write-once type discs. Finally, when switches SW 1 and SW 2 are both open, a playback only mode is entered in which writing is rendered impossible and both disc types can only be played back. Drive controller 2 monitors the status of these switches and therefore knows whether the record and playback apparatus has been set in the erasable mode, the write-once mode, the multi-function mode, or the playback only mode.

Figure 2A:
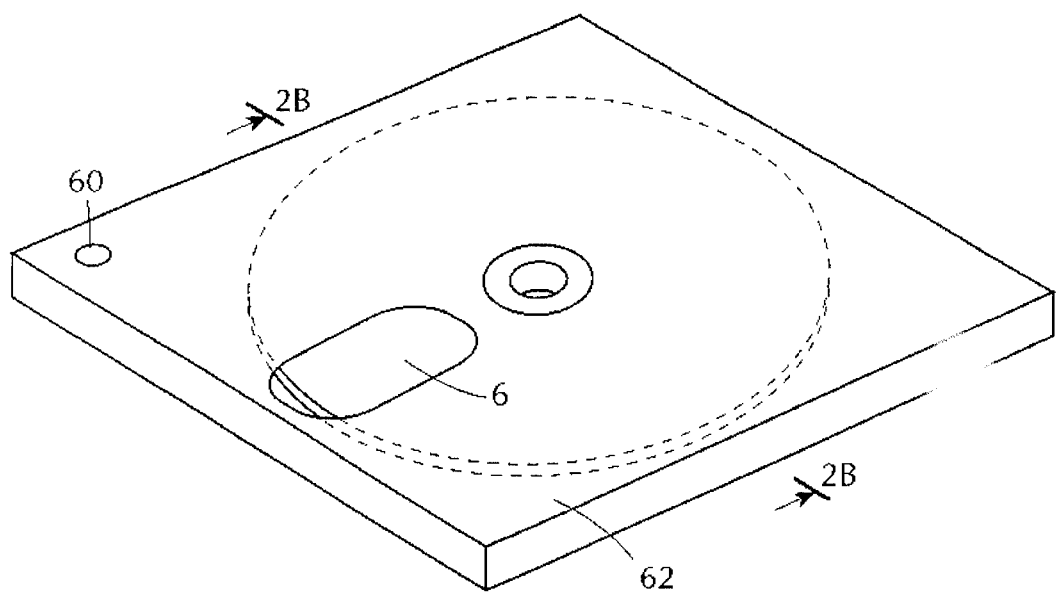
FIG. 2(a) is an isometric representation of an optical disc housed in a cartridge.
Figure 2B:
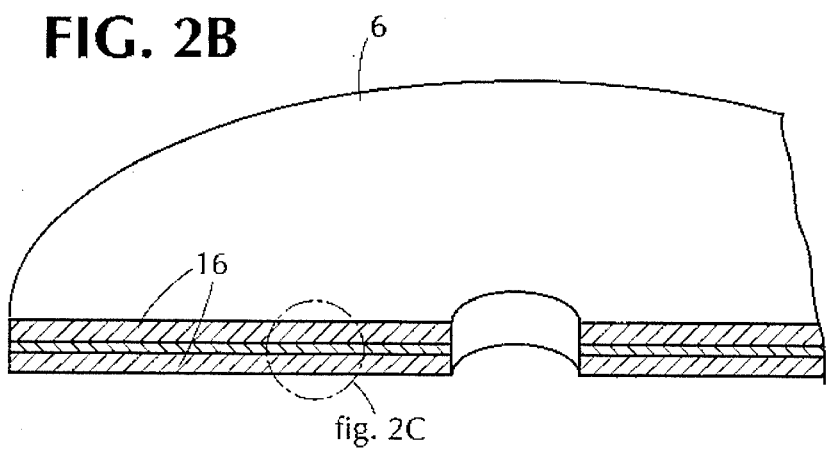
FIG. 2(b) shows a cross-sectional portion of the disc taken along line A—A of FIG. 2(a).
Figure 2C:
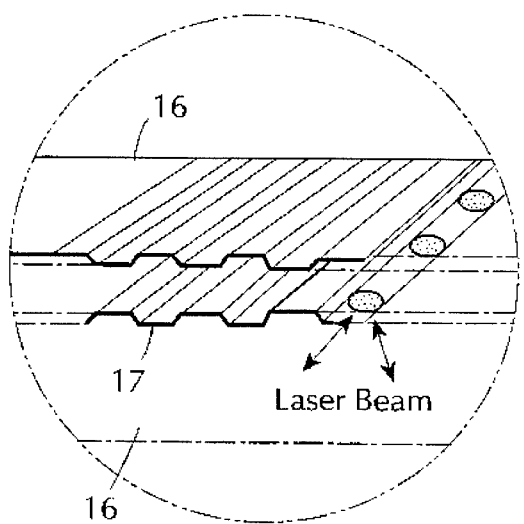
FIG. 2(c) shows an enlarged detail of a region of the cross-sectional portion of the disc.

FIG. 2 shows a cross sectional view and an expanded view of a disc 6 which may be utilized in the record and playback apparatus in accordance with a preferred embodiment of the present invention. Disc 6 has a two-faced structure in which a thin film recording layer of either an erasable type or a write-once type is deposited on a substrate 16. A spiral-shaped track 17 is pre-grooved to a depth of $\lambda/8$ (where $\lambda$ is the wavelength of the laser light) and a signal is recorded and reproduced along this pre-grooved track 17.

Figure 3:
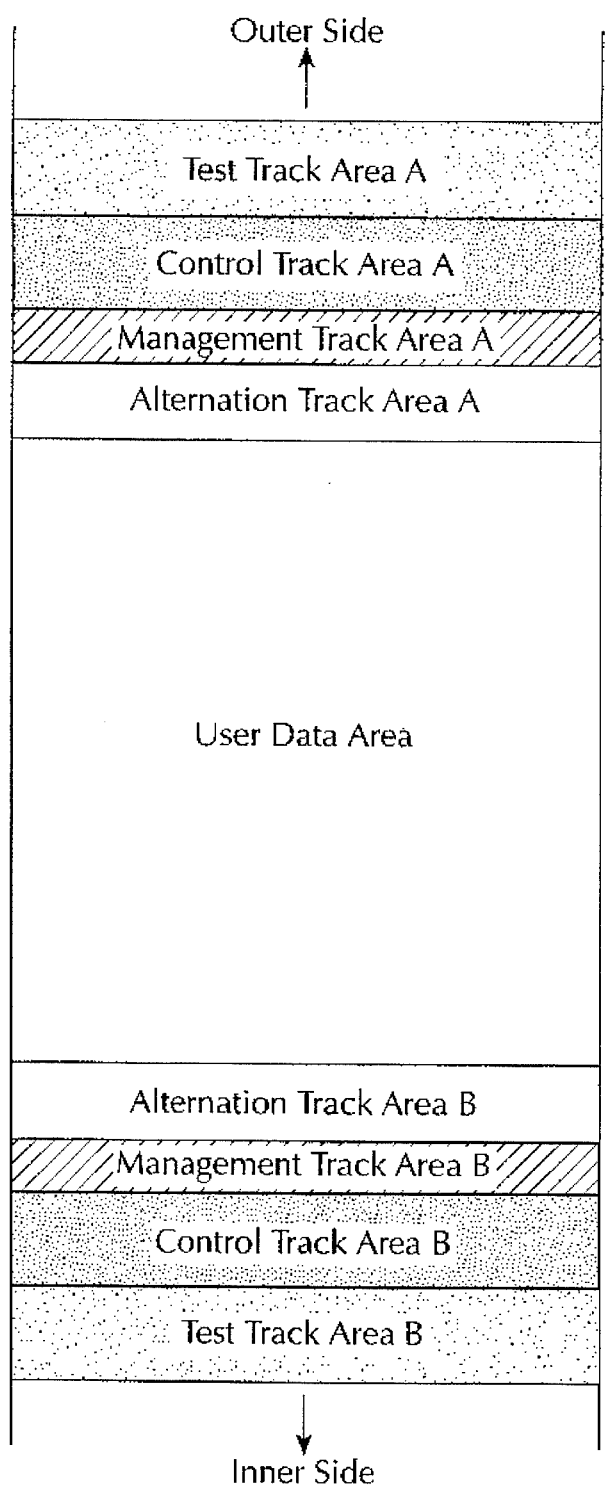
FIG. 3 is a diagram showing how different regions of the disc are allocated in an optical disc used in accordance with the present invention.

FIG. 3 shows the allocation of regions of the discs used in accordance with a preferred embodiment of the present invention. The disc is divided, starting from the outer circumference thereof, into a test track area A, a control track area A, a management track area A, an alternation track area A, a user data area, an alternation track area B, a management track area B, a control track area B and a test track area B.

Figure 4:
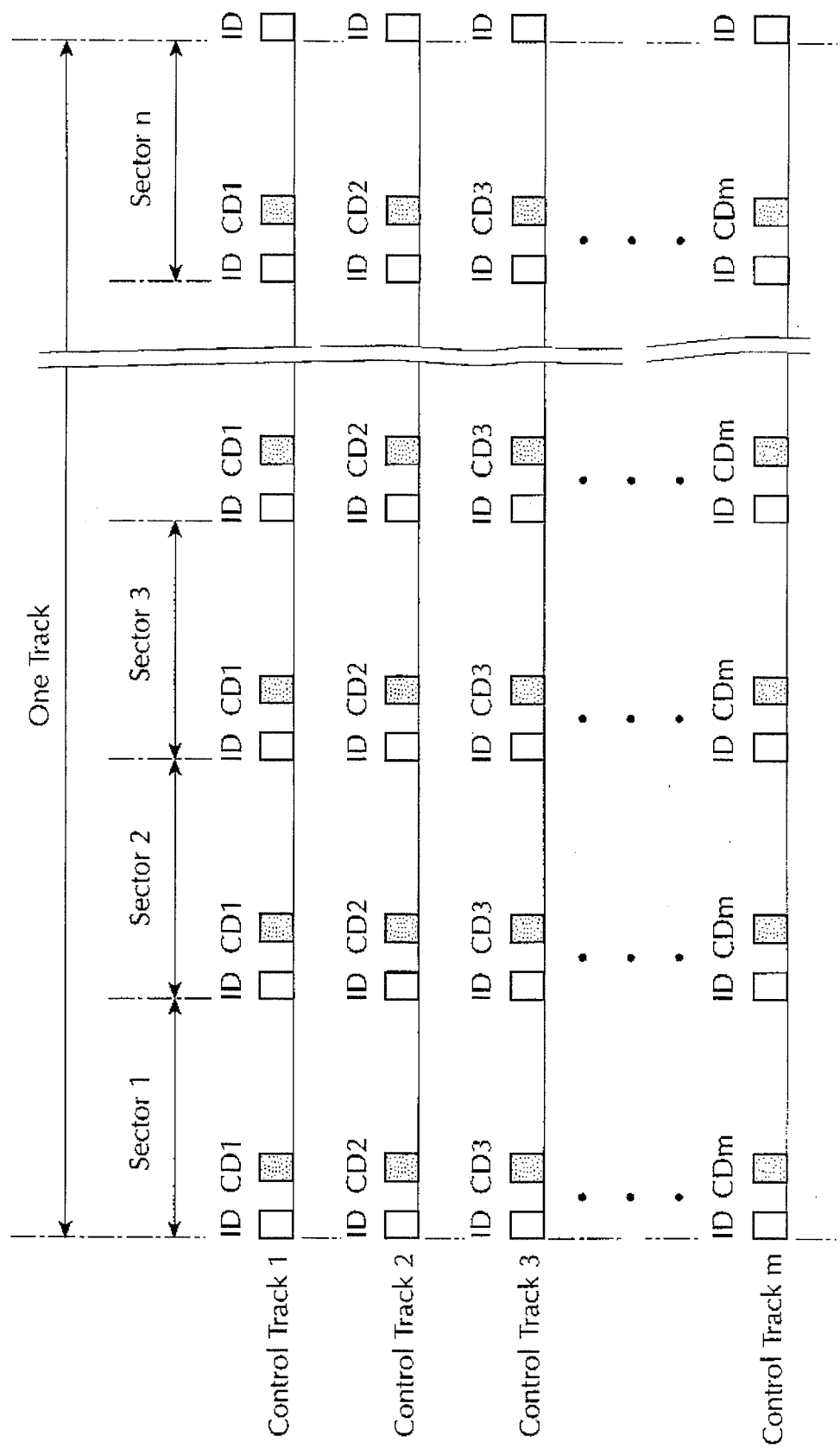
FIG. 4 is a schematic drawing of a control track format.

The test track areas A and B are areas which permits testing of the recording and playback performance of a disc by carrying out a test write on the disc. The control track areas A and B are the areas which are initially read for setting the operating conditions of the record and playback apparatus. An example of the information stored in these control areas is shown in FIG. 4. A control area consists of m tracks (for example, 64 tracks), with each track divided into n sectors. For example, the track A may have 17 sectors and the control track B may have 17 or 18 sectors. In each sector are provided an address signal ID and control data CD as convex and concave bits on the disc substrate 16. The control data are identical throughout one circle of a track and as a track is updated, the control data is updated. The control data may designate, for example, the type of disc (i.e. whether a disc is am erasable type or a write-once type, a type exclusively for playback, or a type which includes a combination of these features).

In addition, the control data includes information about the recording and playback parameters required for operation of the disc. When an optical disc is inserted into the record and playback apparatus, the control data area is read, thereby informing the disc controller 1 of the type of disc which is currently in use, so that the recording and playback parameters corresponding to that particular disc may be set.

On management track areas A and B of FIG. 3 is written data which indicates the fluctuations in recording and erasing sensitivity of the disc caused by manufacturing tolerances. Specifically, the correction power required to compensate for a fluctuation is recorded therein. While discs of a particular type are nominally identical, the recording and playback sensitivities vary from disc to disc due to fluctuations in manufacturing. Therefore, if data corresponding to sensitivity fluctuations specific to each disc is recorded on that disc, the power for recording and erasing may be corrected after this data is read and processed by the record and playback apparatus. This permits each optical disc to be irradiated with optimum power to compensate for sensitivity fluctuations which arise during manufacture.

The alternation track areas A and B are areas which may be alternatively used depending on defects in the disc. In the case of a write-once type disc, the disc is written on only once. Since only playback is performed thereafter, most defects of the disc arise during manufacture, and the number of defects is generally small. However, in the case of an erasable type disc, the same tracks are repeatedly used for recording and erasing. Gradual deterioration due to this repetitive cycling introduces defects which add to the original defects present at the time of manufacture, and consequently the number of defects increases with time. Therefore, in the case of a write-once type disc, either alternation track area A or alternation track area B is used as an alternation track area, and the other is used as a user area. In the case of an erasable type disc, both alternation track areas A and B are generally designated and used as alternative areas for data storage. As its name implies, the user track area is an area designated for the recording and playback of user data.

After the disc controller 1 reads the control data and recognized whether the inserted disc is of a write-once type or an erasable type, recording and playback parameters appropriate to that type of disc are automatically set in the record and playback apparatus of the present invention.

Laser Power Irradiation Parameters

Figure 5:
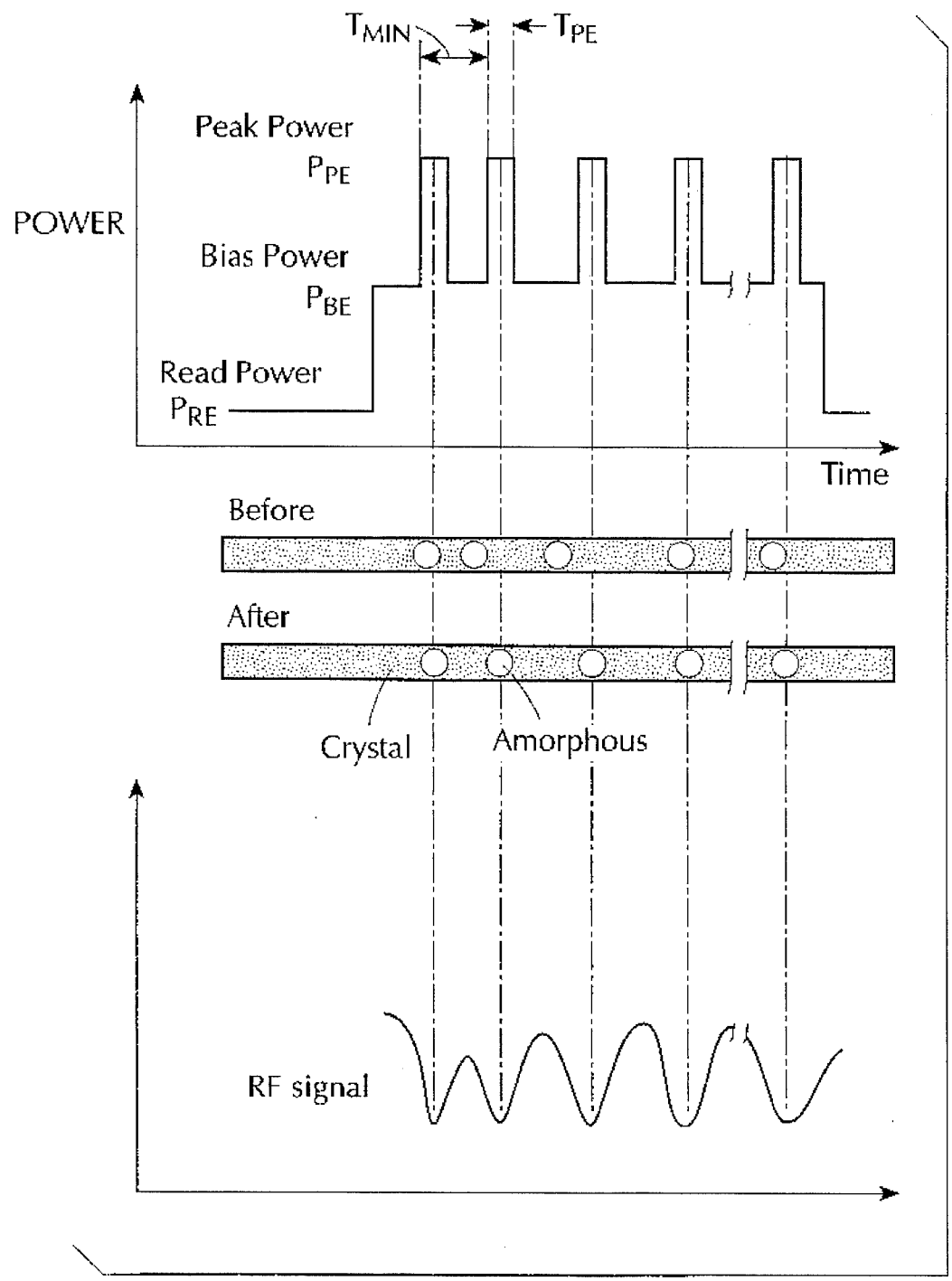

FIG. 5 shows the recording and playback parameters which pertain to an erasable type disc. As an example of an erasable type disc one may consider a phase-change erasable disc in which a reversible phase transition between an amorphous phase and a crystalline phase is utilized. FIG. 5(a) shows a typical laser power modulation waveform for irradiating a phase-change erasable type disc. For example, regions on the disc corresponding in position to the peak power pulses $P_{PE}$ may be designated as a binary "1" of user data, whereas regions corresponding to a binary "0" may be formed by irradiating the erasable disc with the bias power level $P_{BE}$.

FIG. 5(b) is a schematic representation of a track on a disc prior to recording, whereas FIG. 5(c) is a schematic representation of a track on a disc after recording. FIG. 5(d) indicates the playback signal from the track.

With further reference to FIG. 5(a), the various laser power conditions for recording, erasing, and playing back a phase-change erasable type disc are shown. The laser power is generally controlled in 3 stages. The laser power for playback of signals recorded on the disc is at a read power level $P_{RE}$ which, by way of example, is selected to be between 0.3 and 2.5 mW on the disc. The laser power for producing a crystalline state (the erased condition) on the disc is a bias power level $P_{BE}$ which is selected, for example, to be between 3 and 20 mW on the disc. The laser power for producing an amorphous state (the written condition) on the disc corresponds to a peak power level $P_{PE}$ which is selected, for example, to be between 10 and 40 mW on the disc.

The bias power and the peak power levels may be varied as a function of the radial position of the laser spot on the disc. Each power level may be adjusted in such a manner that it is higher towards the outer circumference of the disc and lower towards the inner circumference thereof. In addition, as to a pulse width $T_{PE}$ of the peak power irradiation, the pulse width is generally selected to be between about 20 and 50% of the period $T_{min}$, which corresponds to the maximum frequency of the recording and playback signals.

In the case of an erasable type disc, since the same tracks are repeatedly used for recording, thermal damage is of greater concern as compared to a write-once type disc. Therefore, as compared to a write-once type disc, the pulse width $T_{PE}$ of the peak power irradiation level $P_{PE}$ for an erasable type disc is selected to be small and is chosen in such a manner that thermal damage on the erasable disc is minimized.

During recording, and no matter what the condition of the track prior to recording (as illustrated in FIG. 5(b)), once the track is irradiated with laser power optically modulated as shown in FIG. 5(a), the areas irradiated with the bias power level $P_{BE}$ assume a crystalline state and the areas irradiated with the peak power level $P_{PE}$ assume an amorphous state, thereby forming a recording track having a structure as shown in FIG. 5(c). In this manner, with the laser power optically modulated between two levels (bias power and peak power) at the time of recording, previous data recorded on the disc is erased and simultaneously over-written with new data. This type of recording is possible by using a phase-change material as the recording layer in an erasable type optical disc.

As shown in FIG. 5(d), a playback signal from the disc is obtained by sensing the difference in reflectivity between amorphous and crystalline areas of the track, since the reflectivity of an amorphous area is generally lower than that of a crystalline area. In FIG. 5(d), the amorphous area may be designated as a binary "1" of user data. Since the binary "1" is recorded by changing from a state of high reflectivity (crystalline) to a state of lower reflectivity (amorphous), a low amplitude of the playback signal corresponds to written data in this erasable type disc.

Figure 6:
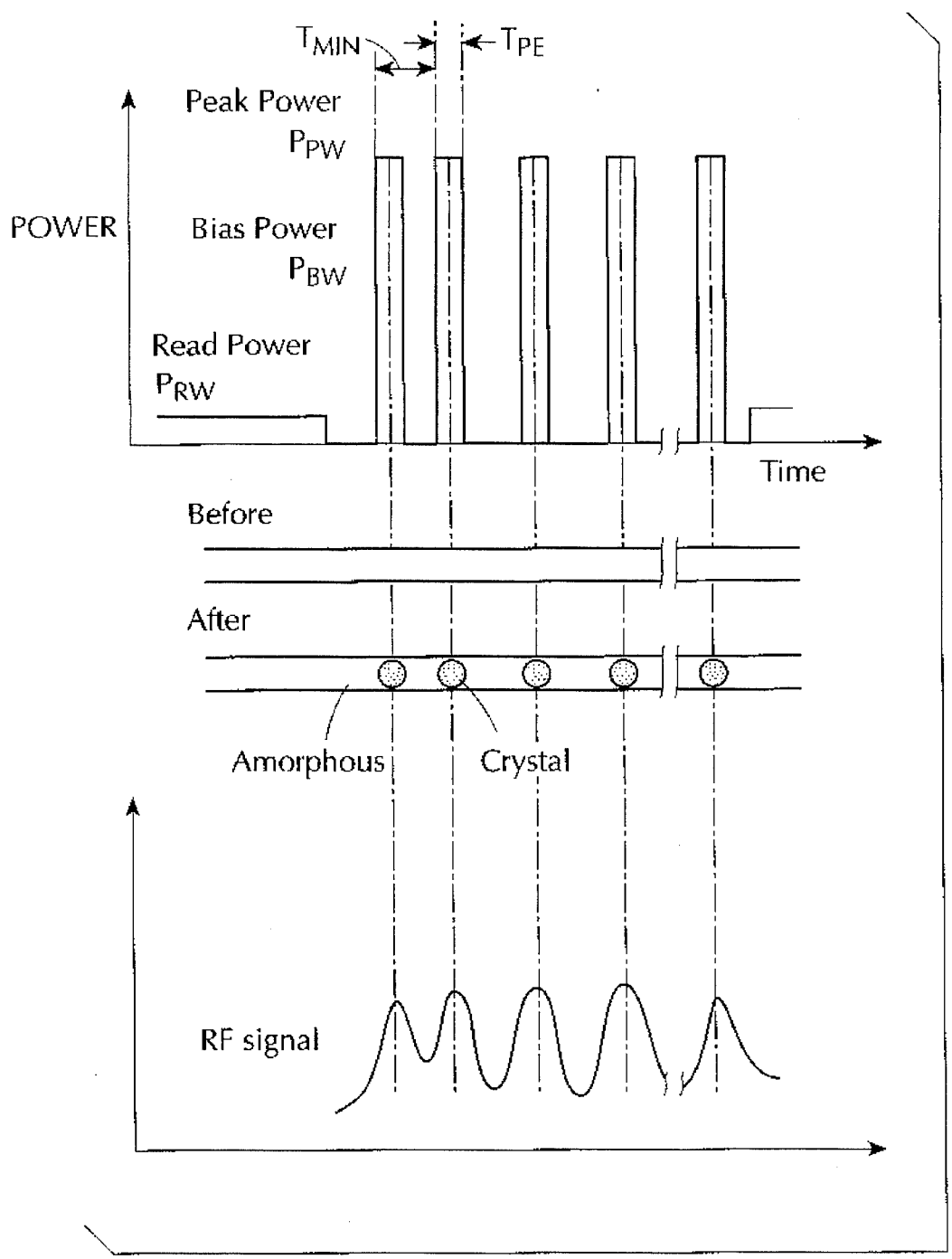

FIG. 6 shows the recording and playback parameters which pertain to a write-once type disc. As an example of a write-once type disc, one may use a phase-change recording material in which a phase transition from an amorphous state to a crystal state is possible only once. FIG. 6(a) shows an optically modulated laser power waveform for irradiating a write-once type disc. By way of example, recording may be performed whereby the position of the peak power pulse corresponds to a binary "1" of user data. FIG. 6(b) shows an unrecorded track prior to recording, which is initially prepared in the amorphous state. FIG. 6(c) shows the track after recording, with crystalline spots formed to correspond to the written state or binary "1" of user data. FIG. 6(d) shows a playback signal from the track of FIG. 6(c).

More specifically, FIG. 5(a) shows that the typical laser power parameters for a write-once disc are controlled in 3 stages. The laser power needed to play back a recorded signal from the disc is at a read power level $P_{RW}$ which is selected to be, for example, between 0.3 and 2.5 mW on the disc. For the write-once disc, the bias power $P_{BW}$ is selected to be lower than the read power $P_{RW}$ (for example 0.4 mW) so that no recording results thereby. The laser power required to produce a crystalline state on the write-once type disc is a peak power level $P_{PW}$, which is selected to be, for example, between 10 and 40 mW on a disc. The peak power level $P_{PW}$ may be varied depending on the radial position of the laser beam on the disc, and is generally adjusted so that it is higher towards the outer circumference of the disc and lower towards the inner circumference thereof. As to the pulse width $T_{PW}$ of the peak power level, the pulse width $T_{PW}$ is selected to be between about 10% and 50% of the period $T_{min}$ which corresponds to the maximum frequency of the recording and playback signal. In the case of a write-once type disc, since recording is only performed once, the thermal damage is generally small in comparison to an erasable type disc. Therefore, as compared to an erasable type disc, the pulse width $T_{PW}$ of the peak power on a write-once type disc may be selected to be relatively large in value.

As shown in FIG. 6(b), all of the unrecorded tracks on the write-once type disc are initially prepared in an amorphous state, and once the unrecorded track is irradiated with optically modulated laser power as shown in FIG. 6(a), the areas irradiated with the very low bias power level $P_{PW}$ do not change (i.e. they remain in the amorphous state), whereas the areas irradiated with the peak power level $P_{PW}$ transform to a crystalline state, thereby forming a recorded track as shown in FIG. 6(c). Thus, by optically modulating the laser power between two levels (bias power and peak power), data may be written once on the disc.

As shown in FIG. 6(d), a playback signal from the write-once disc is obtained by measuring the difference in the read laser power reflected from the disc, since the reflectivity of an amorphous area is lower than that of a crystalline area. In this example of a preferred embodiment, the amorphous area is recorded and played back to correspond to a binary "1" of user data. Since a binary "1" of user data is recorded by changing from an amorphous state of low reflectivity to a crystalline state of high reflectivity, a high amplitude of the playback signal corresponds to written data in the write-once type disc.

Figure 7:
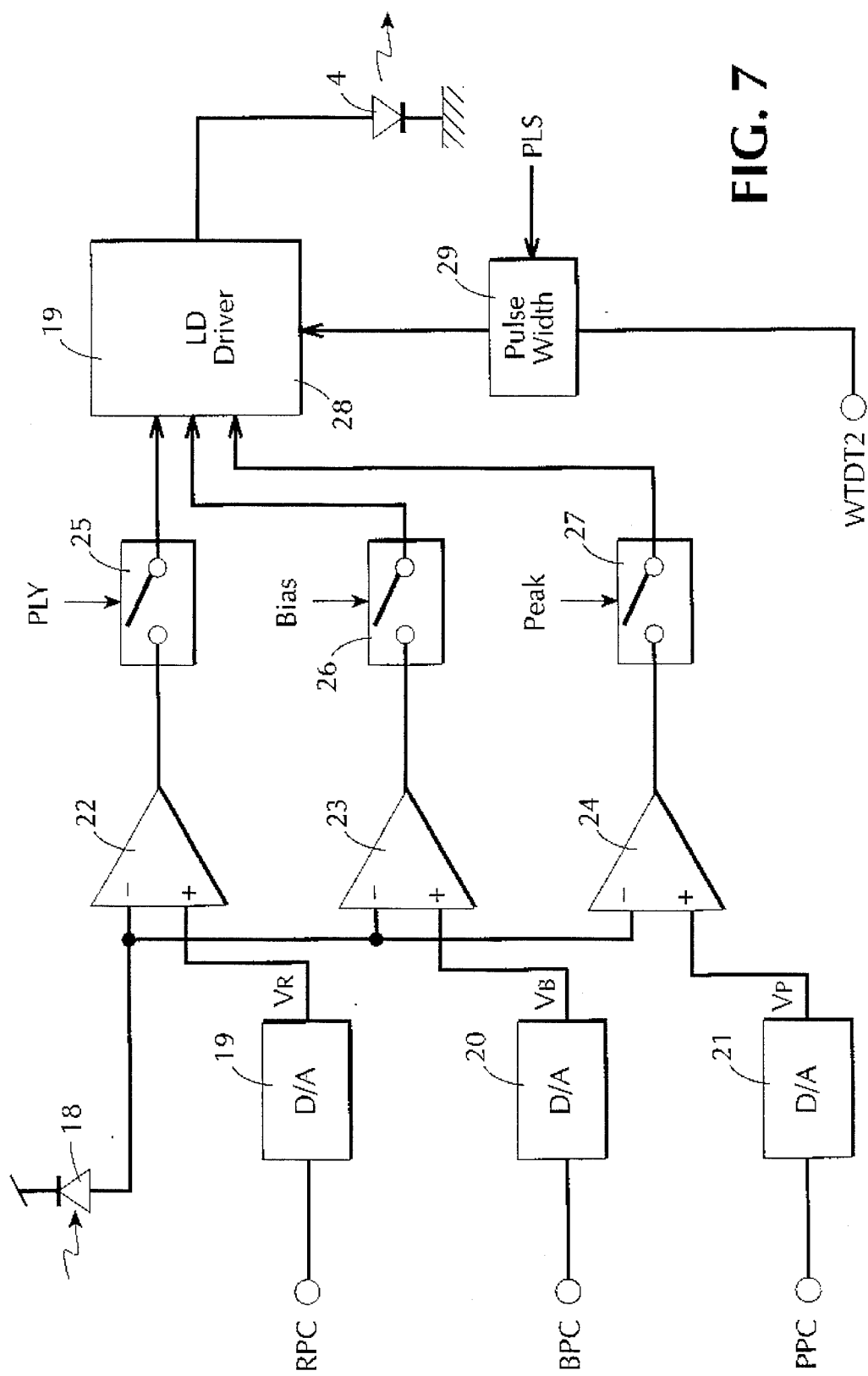
FIG. 7 is a block diagram of a laser power control circuit.

If laser power parameters are selected in accordance with the criteria shown in FIGS. 5(a) or FIG. 6(a), recording and playback of information on an erasable type disc or a write-once type disc becomes possible. The laser power parameters are controlled by the laser power control circuit 3 of FIG. 1. FIG. 7 shows a more detailed preferred embodiment of the laser power control circuit 3.

With reference to FIG. 7, the laser diode 4 is controlled to provide the required power levels. A pin diode 18 is used to monitor the power output of laser diode 4. Signal RPC carries read power data by which the read power is determined, signal BPC carries bias power data by which the bias power signal is determined and signal PPC carries peak power data by which the peak power is determined. Signals RPC, BPC and PPC are obtained from the drive controller 2 shown FIG. 1. The three power data signals RPC, BPC and PPC are respectively converted into reference voltages VR, VB and VP by digital to analog (D/A) converters 19–21. Each of the above-mentioned reference voltages is compared with the monitor output from the pin diode 18 in differential amplifiers 22–23 respectively, the outputs of which are sent through analog switches 25–27 to a laser drive circuit 28 which drives the laser diode 4 to output the required power level. Analog switch 25 is closed by a PLY signal at the time when a read power level is required; analog switch 26 is closed by a BIAS signal when a bias power level is required; and analog switch 27 is closed by a PEAK signal at the time when a peak power level is required.

In operation, when the record and playback apparatus is first powered up, a control track on the disc is read to determine the type of disc being utilized. If it is found that the disc is an erasable type disc, an optically modulated waveform, as shown in FIG. 5(a), may be obtained by outputting a signal RPC to generate the appropriate read power level $P_{RE}$ (e.g. from 0.3 to 2.5 mW) needed to playback information stored on the erasable type disc; or by outputting a signal BPC to generate the required bias power level $P_{BE}$ for erasable type discs (e.g., from 3 to 20 mW); or by outputting a signal PPC to generate the requisite peak power level $P_{PE}$ for erasable type discs (e.g. from 10 to 40 mW). Signals RPC, BPC and PPC are provided by drive controller 2.

If during start-up the control track indicates that the disc is a write-once type disc, then an optically modulated waveform of the type shown in FIG. 6(a) can be obtained by outputting a signal RPC for generating the requisite read power level $P_{RW}$ (for example, from 0.3 to 2.5 mW) for playback of a write-once type disc; or by outputting a signal BPC for generating the bias power level $P_{BW}$ for write-once type discs (for example from 0 to 1.0 mW); or by outputting a signal PPC for generating the peak power level $P_{PW}$ (for example, from 10 to 40 mW).

The pulse widths $T_{PE}$ and $T_{PW}$ of the peak power level for erasable type discs or write-once discs, respectively, are obtained by converting the above-mentioned write data WTDT 2 to a pulse width selected by a pulse width control circuit 29, which is then applied to the laser drive circuit 28 to provide the desired optical modulation. The selection of the pulse width is made in accordance with a PLS signal sent from the drive controller 2. In the case of an erasable type disc, a pulse width $T_{PE}$ of 30 to 130 ns is selected, whereas in the case of a write-once type disc, a pulse width $T_{PW}$ of 40 to 130 ns is selected.

As described above, the laser control circuit of FIG. 7 may be incorporated in the optical disc record and playback apparatus in accordance with the present invention. In operation, after a determination is made by reading the control track data, as to whether an inserted disc is an erasable type disc or a write-once type disc, the laser power control circuit of FIG. 7 makes it possible to set the optimum recording and reproducing parameters for each disc. Specifically, the laser power control circuit controls the switching of the laser power levels between playback, bias and peak powers, and also switches the peak power pulse width to the appropriate values, depending on the type of disc being utilized.

Playback Parameters

Figure 8:
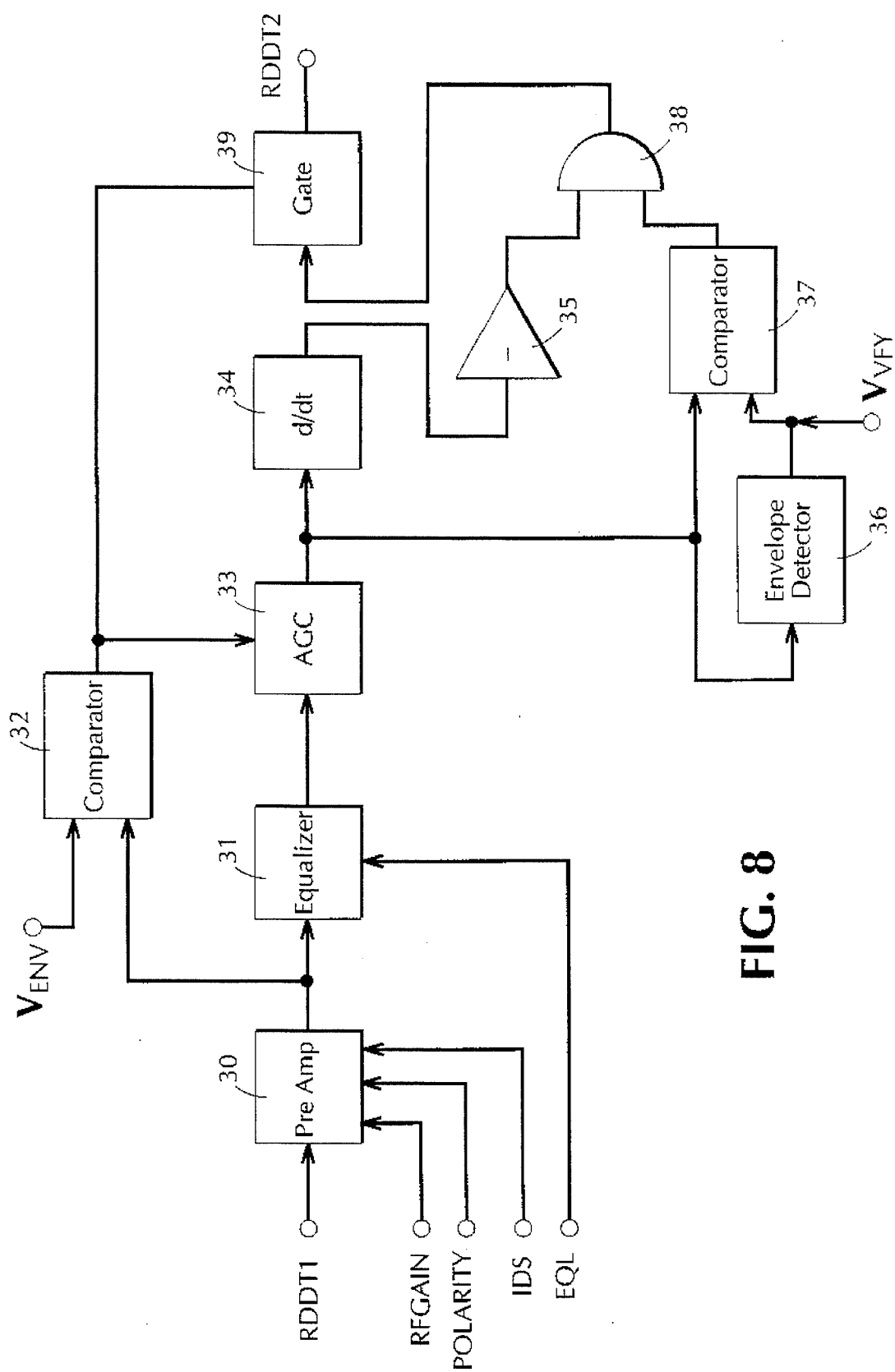
FIG. 8 is a block diagram of a playback signal processing circuit.

FIG. 8 shows a detailed block diagram of the signal processing circuit 10 (FIG. 1) used in the optical disc recording and playback apparatus in accordance with a preferred embodiment of the present invention.

As described before, the playback signal from an erasable type disc has a low signal amplitude indicating the presence of data (as shown in FIG. 5(d)), whereas the playback signal for a write-once type disc has a high signal amplitude indicating the presence of data (as shown in FIG. 6(d)), because the polarity of the playback signal is different for these two types of discs. Additionally, since the reflectivity of an erasable type disc is generally higher than that of a write-once type disc, the amplitude of the playback signal for the erasable type disc is higher. Therefore, in order to properly playback either type of disc, it is necessary to select the polarity and the amplification of the playback signal. These functions are performed in the analog signal processor 10 of FIG. 1, shown in detail in FIG. 8.

With reference to FIG. 8, a playback signal RDDT 1 from the head amplifier 9 (FIG. 9) is sent to a pre-amplifier 30.

The pre-amplifier 30 is designed in such a manner that it may select the polarity of an amplifier contained therein as determined by a POLARITY signal sent from the drive controller 2. Additionally, an attenuation factor for the amplifier contained therein may be selected to be, for example, 0, −2, −4, −6, and 26 dB, in response to the value of an RFGAIN signal. In the case where a reading of the control track indicates that the disc is an erasable type, the pre-amplifier 30 behaves as an inverting amplifier and an attenuation rate may be selected to be, for example, −4 dB. In the case where the disc being used is a write-once type, the pre-amplifier 30 acts as a non-inverting amplifier and the attenuation factor may be selected to be, for example, 0 dB.

The selection of the polarity and attenuation factor of the pre-amplifier 30 may also be used during playback of the address signal (ID signal) of each track. For example, the polarity and amplitude of an ID signal differs between an ID signal for a groove track 17 (shown in FIG. 2) having a depth of $\lambda/8$ (where $\lambda$ is the laser wavelength), an ID signal for an on-land track having a depth of $\lambda/4$ and a groove track of depth $\lambda/8$, as used in an ordinary magneto-optical disc (MO) of the ISO (International Standard Organization). For example, in the case of a groove track, the above-mentioned polarity remains uninverted and the attenuation factor is set to 0 dB. In the case of an on-land track, the above-mentioned polarity is inverted and the attenuation factor may be selected to be −6 dB. During recording the gain of pre-amplifier 30 is held at −26 dB, thereby preventing the reflected light from saturating the pre-amplifier 30.

Whether the signal being played back originates from a user data section or from an ID signal section, can be determined from the IDS signal. The IDS signal is an address gate which is present only when an ID section is being played back.

The output of pre-amplifier 30 is sent to an equalizer 31. The characteristics of the equalizer 31 are selected by an EQL signal so that an optimum equalizer level is selected for an erasable type disc or a write-once type disc. The output signal from the pre-amplifier 30 is also sent to a comparator 32. Comparator 32 functions to detect the presence of unrecorded section on the disc, and operates in the following manner. If a playback signal is smaller than an envelope detection level $V_{ENV}$, it is judged to be an unrecorded signal level. In this case, the gain of an AGC circuit 33 (described more fully below) is clamped, and the data gate 39 is opened to prevent a noise signal corresponding to an unrecorded section of the disc from being output. In this manner, the playback signal processor circuit prevents noise corresponding to an unrecorded section of the disc from being output. An optimum value for the signal $V_{ENV}$ may be selected depending on an whether the disc being utilized is an erasable type disc or a write-once type disc. For example, in the case of an erasable type disc (for which the playback signal is relatively large), the signal $V_{ENV}$ is set to a relatively high value. On the other hand, in the case of a write-once type disc for which the amplitude of the playback signal is relatively small, the $V_{ENV}$ signal is set to a lower value.

Auto gain control (AGC) circuit 33 absorbs amplitude differences which cannot be absorbed by the pre-amplifier 30 and outputs a signal of a certain amplitude. Differential circuit 34 is coupled to an inversion amplifier 35, from where a pulse signal corresponding to a binary "1" of data is obtained. Envelope detection circuit 36, with about one half of the envelope-detected level as a threshold level, provides a gate signal to a comparator 37 for selecting data "1". The threshold level may be varied by applying an external $V_{VFY}$ voltage to the comparator 37. Signal $V_{VFY}$ is called a verify voltage, and is used to play back a signal by intentionally changing the threshold level immediately after recording of the signal, for determining whether or not the signal has been recorded in a sufficiently stable manner.

An optimum value for this verify voltage $V_{VFY}$ depends upon whether the disc being played back is an erasable type disc or a write-once type disc. For example, for an erasable type disc in which unerased signals may be generated, the verify voltage $V_{VFY}$ may be set low in comparison with a write-once type disc. If the above-mentioned pulse signal and gate signal produce an output at AND gate 38, the signal output therefrom becomes the read data signal RDDT 2.

To summarize, the playback signal processor circuit of FIG. 8 may be used in the recording and playback apparatus in accordance with a preferred embodiment of the present invention. In operation, after determining from the control track data whether an erasable type disc or a write-once type disc is being utilized, the playback signal processing circuit sets optimum playback conditions for each type of disc. Specifically, the playback signal processing circuit provides for the switching of the polarity and attenuation level of the playback signal (both data and ID signals), the detection and switching out of signals corresponding to unrecorded sections of the disc, the switching of appropriate equalizer levels, verify voltage levels, etc.

Servo Parameters

Figure 9:
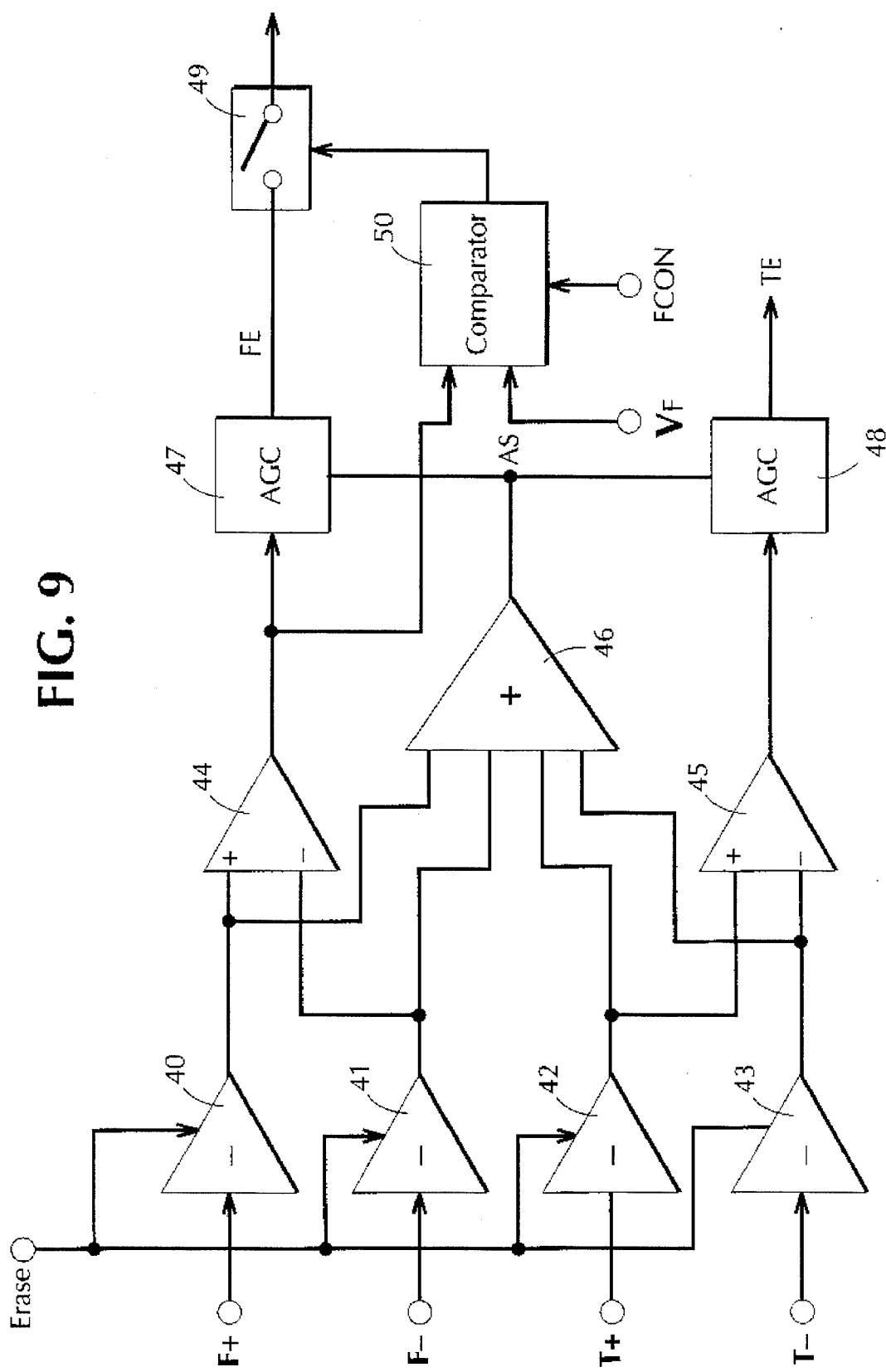
FIG. 9 is a block diagram of a servo circuit.

FIG. 9 shows, in block diagram form, a preferred embodiment of a servo circuit for providing focusing and tracking control in the record and playback apparatus of the present invention.

Focus signals F+ and F− and tracking signals T+ and T− are obtained from the optical detector 8 in the optical head 5 (see FIG. 1). The above-mentioned signals are respectively input to servo amplifiers 40–43. The gain of each of the servo amplifiers 40–43 may be switched by an ERASE signal obtained from the drive controller 2. As explained with regard to FIGS. 5(a) and FIG. 6(a), the optical modulation waveforms for recording are different for an erasable type disc and for a write-once type disc. Therefore, the reflected light levels at the time of recording, and in particular, the signal levels of the F+, and F− and T+ and T− signals differ greatly depending upon whether an erasable type disc or a write-once type disc is being utilized.

For example, although the read power level is 1.5 mW for both types of discs, the bias power level $P_{BE}$ is 10 mW and the peak power level $P_{PE}$ is 20 mW for an erasable type disc, whereas the bias power level $P_{BW}$ and the peak power level $P_{PW}$ are respectively selected to be 0.4 mW and 18 mW for a write-once type disc. If, for simplicity, we assume that the pulse width of the peak power level is 33% of the period of the maximum recording frequency signal for either of the two types of discs, then the average recording power for an erasable disc is about 13.2 mW, which is about 8.8 times that of the read power in the case of an erasable type disc. In the case of a write-once type disc, the average recording power is about 6.2 mW, or about 4 times-that of the read power. The factor of 4 in the case of a write-once type disc can be absorbed in an AGC circuit. However, the factor of 8.8 for an erasable type disc is too large to be absorbed by the AGC circuit. Therefore, in the servo circuit used in the record and playback apparatus of the present invention, the gain of each of the above-mentioned servo amplifiers 40–43 is reduced by about ½ to ⅛ by an ERASE signal only when recording on an erasable type disc, so that the signals will fall within the operating range of an AGC circuit.

Servo amplifiers 40–43 are coupled as shown in FIG. 9 to differential amplifiers 44 and 45 and to summing amplifier 46. Automatic gain control (AGC) circuits 47, 48 maintain the output of each of the above-mentioned differential amplifiers at a constant level by dividing the signal output from the differential amplifiers 44 and 45 by a signal AS output from the summing amplifier 46. The output signal from the AGC circuit 47 provides a focus error signal FE which is sent to the focus servo circuit through an analog switch 49.

Analog switch 49 is used during adjustment of the focus servo. To adjust the focus servo, an actuator 13 in the optical head is moved up and down in response to a focus on signal FCON. The analog switch 49 is closed by an output signal from a comparator 50 when the output from the differential amplifier 44 exceeds the threshold level $V_F$ of the comparator 50, thereby providing adjustment of the focus servo. As explained, the reflectivity of an erasable type disc is different from that of a write-once type disc, with the reflectivity being higher for an erasable type disc as compared to a write-once type disc. Therefore, the above-mentioned comparator level $V_F$ is different for each type of disc. For example, the level $V_F$ is set high for an erasable type disc and low for a write-once type disc. AGC circuit 48 generates a tracking error signal TE which is provided to a tracking servo circuit.

With the servo circuit of FIG. 9 incorporated in the optical disc record and playback apparatus of the present invention, after a determination is made as to whether an erasable type disc or a write-once type disc is being utilized, it is possible to set the optimum focus and tracking conditions for each disc. Specifically, the servo circuit of FIG. 9 provides for the adjustment of the amplification of the servo amplifiers at the time of recording, and for the adjustment of the comparator levels which control the output of the focus servo.

Data Format

Figure 10A:
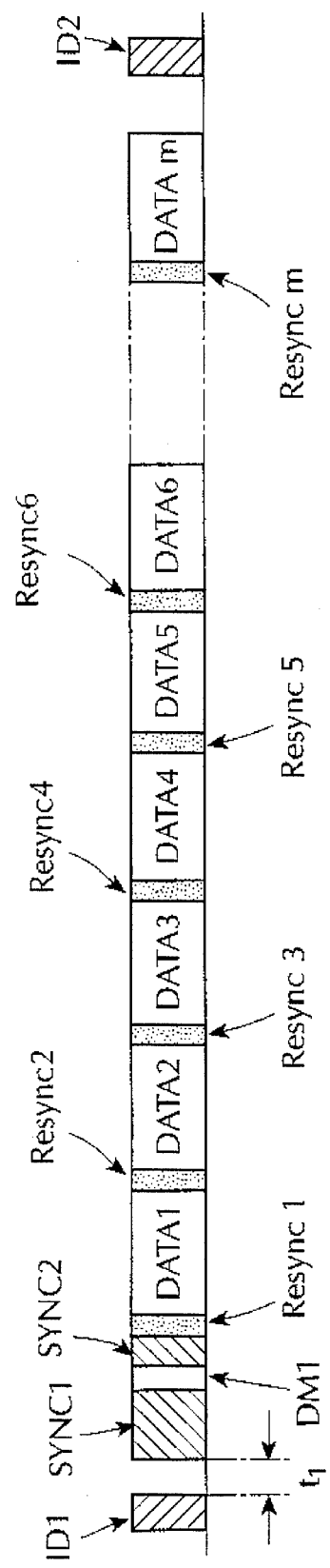
FIG. 10(a) is a schematic drawing of the data format.

FIG. 10(a) is one example of a data format recorded on a write-once type disc. Address signals ID 1 and ID2 are written on the disc in advance, and $t_1$ sec after ID 1, recording starts with a SYNC 1 signal. SYNC 1 and SYNC 2 are identical signals, which are used for adjusting a phase locked loop (PLL) circuit during playback. In general, to provide the SYNC 1 and SYNC 2 signals, the highest frequency signals are recorded, with the length of the SYNC 1 signal being, for example, 12 bytes. Data mark 1 (DM1) is a signal for identifying the beginning of the DATA 1 signal. To distinguish it from the SYNC 1 and SYNC 2 signals, a signal of the lowest frequency is recorded to represent DM1. The signals DATA 1 to DATA m represent m blocks of user data, and at the beginning of each of these respective data blocks there are provided RESYNC signals 1 through m which identify the beginning of each of the data blocks.

Figure 10B:
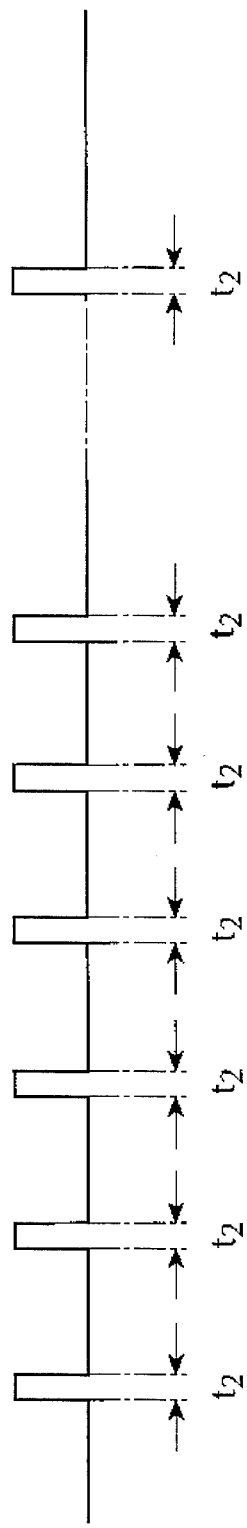
FIG. 10(b) illustrates the resync gate signal.

FIG. 10(b) shows resync gate signals for selecting the above-mentioned RESYNC signals and their corresponding data blocks during playback operation. To account for jitters of the disc motor, the gate signals have slightly larger widths ($t_2$) than the widths of the RESYNC signals.

Figure 11A:
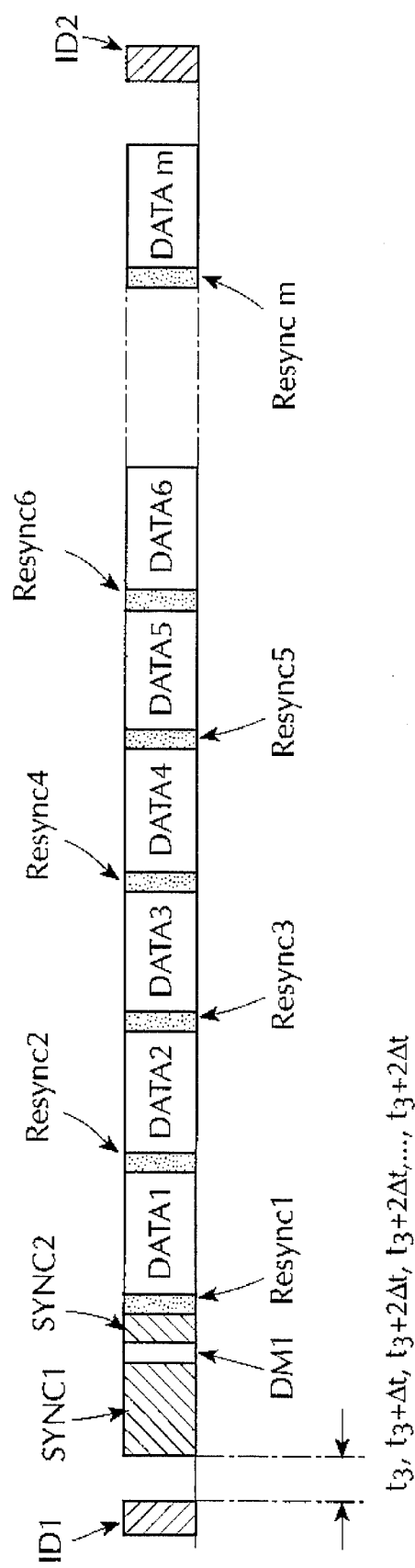
FIG. 11(a) is a schematic drawing of the data format and FIG. 11(b) illustrates the resync gate signal.

FIG. 11(a) shows one example of a data format recorded on an erasable type disc. Address signals ID 1 and ID 2 are written on the disc in advance, and recording starts with the SYNC 1 signal. Here the recording start time for an erasable type disc is different from that of a write-once type disc. Since the same track is used repeatedly for recording the case of an erasable type disc, deterioration of the recording layer on which the same data patterns (i.e. the SYNC 1, SYNC 2, DM 1 and RESYNC 1 through m signals) are recorded is accelerated. To reduce deterioration, the recording start positions are intentionally changed in a random manner so that the same signals are not repeatedly recorded on the same positions of the recording layer, thereby preventing the film from deteriorating. Specifically, the starting position for recording the SYNC 1 signal and its contiguous data block DATA 1 signal is randomly changed to fall in an interval between t3 and t3+Δt, where Δt is randomly determined. Other sync signals and data blocks are recorded on the disc in the same manner. SYNC 1 and SYNC 2 are identical signals, and, as in the case of the write-once type disc, are used for adjusting a phase locked loop (PLL) circuit during playback.

In general, the highest frequency signals are used to record the SYNC 1 and SYNC 2 signals. However, the length of the SYNC 1 signal on an erasable type disc is, for example, 20 bytes, and is longer in comparison to the length of the SYNC 1 signal (12 bytes) for a write-once type disc. This is because the deterioration due to repeated recording on the same track is taken into account for the erasable type disc.

With reference to FIG. 11(a), data mark 1 (DM 1) is a signal for identifying the beginning of the DATA 1 block. The DM1 signal is also different from the corresponding signal for a write-once type disc. In the case of a write-once type disc, as mentioned above, in order to distinguish the DM1 signal from the SYNC1 and SYNC2 signals, a Signal of the lowest frequency is recorded. In the case of an erasable type disc, however, a pattern that makes the temperature difference at the boundary between the regions where the DM 1 and the SYNC 1 and SYNC 2 are to be recorded as small as possible (when the same track is used repeatedly for recording) is selected for the data mark (DM1) signal. If the temperature difference at the above-mentioned boundary is large, thermal stress accumulates with repeated recordings and it is possible that the recording film may deteriorate at that boundary. Specifically, for the data mark 1 on an erasable disc, use is made of a signal pattern having a high frequency which is as close as possible to the patterns of the SYNC 1 and SYNC 2 signals.

Figure 11B:
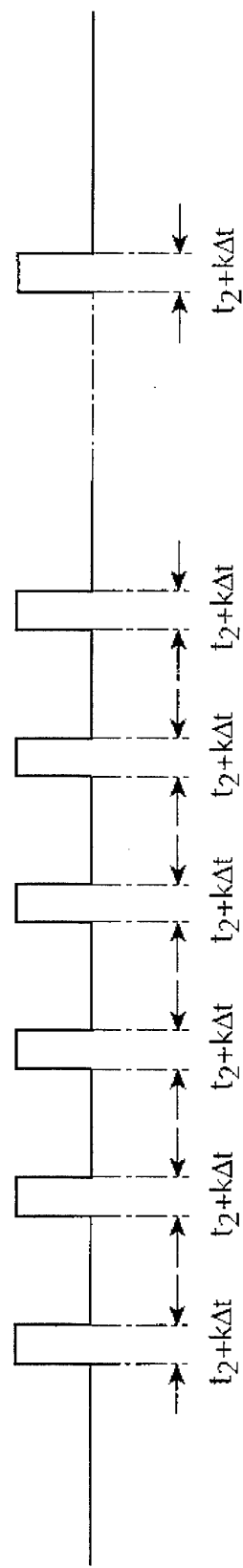

FIG. 11(b) shows resync gate signals for selecting the RESYNC signals during playback of an erasable disc. With an erasable disc, since data is recorded, as mentioned above, by randomly changing the recording start position by a random interval of Δt in the range between t3 and t3+kΔt, the resync gate signal must follow this pattern and be as wide as t2+kΔt.

As described above, in-the preferred embodiment of the record and playback apparatus of the present invention, after determining whether an erasable type disc or a write-once type disc is utilized (by reading the control track data), an optimum format for each type of disc may be set and recorded. Specifically, the data format provides for adjustment of the recording start position, adjustment of the length of the SYNC signal, and the switching of various patterns for the data mark and resync gate signals, etc., in accordance with the type of disc being utilized.

In the above embodiments, the identification of an erasable type disc or a write-once type disc is made by reading the control track data. Alternatively, it is also possible to make this identification by mechanical means, such as by detecting the presence of a sensor hole 60 positioned on a cartridge 62 which houses the disc 6 (see FIG. 2(*a*)).

Although the invention disclosed herein has been described with reference to particular embodiments, it is to be understood that these embodiments are merely illustrative of the different aspects and features of the invention. As such, a person skilled in the art may make numerous modifications to the illustrative embodiments described herein, and other arrangements may be devised to implement the invention, without departing from the spirit and scope of the invention as disclosed and claimed.

What we claim is:

1. An apparatus which utilizes a laser for optically recording, erasing and playing back information encoded on a disc which may be an erasable type disc or a write-once type disc, said disc types requiring said apparatus to be set to different operating parameters, said apparatus comprising;

(a) means for identifying which of said two disc types is inserted therein; and (b) playback signal processing means for changing the polarity of a playback signal accordance with said identified disc type.

2. The apparatus of claim 1, wherein said means for identifying said disc types includes means for processing identifying data stored on a control track of said disc.

3. The apparatus of claim 1, wherein said means for identifying said disc types determines the presence of an identifying mark on a housing in which said disc is enclosed.

4. The apparatus of claim 1, wherein said playback signal processing means further includes means for changing the polarity of said playback signal, depending upon whether said playback signal is an address signal or a data signal.

5. The apparatus of claim 1, wherein said playback signal processing means changes equalization of said playback signal in accordance with said identified disc type.

6. An apparatus which utilizes a laser for optically recording, erasing and playing back information encoded on a disc which is either an erasable type disc or a write-once type disc, said disc types requiring said apparatus to be set to different operating parameters, said apparatus comprising:

(a) means for identifying which one of said disc types is inserted therein; and (b) data format means which randomly changes the start position for recording of said information when said disc inserted in said apparatus is identified to be an erasable type disc.

7. The apparatus of claim 6, wherein said means for identifying said disc types included means for processing identifying data stored on a control track of said disc.

8. The apparatus of claim 6, wherein said means for identifying said disc types determines the presence of an identifying mark on a housing in which said disc is enclosed.

9. The apparatus of claim 6, wherein said data format means provides a data format in which said recorded information is encoded into a plurality of data blocks having resync signals separating each of said blocks, said data format means setting a gate signal for selecting said resync signals wherein the width of said gate signal is set in accordance with said identified disc type.

10. The apparatus of claim 9 wherein the width of said gate signal for selecting said resync signals is set to be wider for an erasable type disc than for a write-once type disc.

11. The apparatus of claim 9 wherein said data format further includes sync signals at the beginning said data blocks, and said data format means sets the length of at least one of said sync signals to be greater for an erasable type disc than for a write-once type disc.

12. The apparatus of claim 9 wherein said data format further includes a data mark signal at the beginning of said data blocks for synchronizing the playback thereof, and wherein said data format means sets the average frequency of said data mark signal higher for an erasable type disc than for a writer-once type disc.

13. The apparatus of claim 9 wherein the size of alternative areas on said disc for recording user data is set to be greater for an erasable type disc than for a write-once type disc.

14. An optical disc record and playback apparatus for receiving an erasable type disc or a write-once type disc, each of said disc types requiring said apparatus to be set to different operating conditions, said apparatus comprising:

(a) means for identifying the type of disc inserted in the apparatus by processing identifying data stored on a control track of said disc, and (b) means for controlling the pulse width of said laser in accordance with said identified disc type.

15. An apparatus for recording, erasing and playing back information encoded on a disc corresponding to one of at least two disc types, said disc types including an erasable type disc and a write-once type disc having fluctuation data caused by manufacturing tolerances recorded thereon, each disc type and said fluctuation data requiring said apparatus to be set to different operating parameters, said apparatus comprising:

(a) means for identifying said disc type inserted therein;

(b) means for detecting said fluctuation data; and (c) means for setting said operating parameters to different values in accordance with said identified disc type and said detected fluctuation data.

16. An apparatus in accordance with claim 15 wherein said apparatus utilizes a laser for optically recording, erasing and playing back said information encoded on said disc.

17. An apparatus in accordance with claim 16, further including means for changing the operating parameters of said laser in accordance with said identified disc type and said fluctuation data, and playback signal processing means for controlling the playback parameters of said apparatus in accordance with said identified disc type and said fluctuation data.

18. An apparatus in accordance with claim 17, further including servo circuit means for providing focusing and tracking control of said laser with respect to said disc.

19. An apparatus in accordance with claim 18, further including data format means for setting the format of said information encoded on said disc in accordance with said identified disc type and said fluctuation data.

20. An apparatus in accordance with claim 19, further including selectable switch means for selecting and setting an operating mode of said apparatus.

21. A disc onto which optical power is incident to record or reproduce information, said disc having prerecorded thereon fluctuation data caused by manufacturing tolerances that is representative of the optical sensitivity of said disc, said fluctuation data being utilized to adjust said optical power during recording of said information.

22. An apparatus in which optical power is incident on a disc for optically recording information thereon, said disc having prerecorded thereon fluctuation data caused by manufacturing tolerances that is representative of the optical sensitivity of said disc, said apparatus comprising:

(a) means for detecting said fluctuation data and producing signals indicative of the optical sensitivity of said disc; and (b) means responsive to said signals for adjusting optical characteristics of said apparatus during recording of information on said disc.

23. A system for optically recording, erasing and playing back information comprising:
 (a) a disc onto which optical power may be applied to record information thereon, said disc having prerecorded thereon fluctuation data caused by manufacturing tolerances representative of the optical sensitivity of said disc; and
 (b) means responsive to said fluctuation data for setting the operating characteristics of said system in accordance with said prerecorded fluctuation data.

* * * * *